(12) United States Patent
Cappellotto et al.

(10) Patent No.: US 8,033,617 B2
(45) Date of Patent: Oct. 11, 2011

(54) WIRE-SPOKED WHEEL HAVING SPOKES COUPLED TO RIM

(75) Inventors: Guido Cappellotto, Arcore (IT); Fabio Alberio, Cinisello Balsamo (IT)

(73) Assignee: Alpina Raggi S.p.A., Lomagna (IT)

( * ) Notice: Subject to any disclaimer, the term of this patent is extended or adjusted under 35 U.S.C. 154(b) by 239 days.

(21) Appl. No.: 11/992,433

(22) PCT Filed: Sep. 14, 2006

(86) PCT No.: PCT/IT2006/000659
§ 371 (c)(1),
(2), (4) Date: Mar. 21, 2008

(87) PCT Pub. No.: WO2007/049317
PCT Pub. Date: May 3, 2007

(65) Prior Publication Data
US 2009/0189435 A1    Jul. 30, 2009

(30) Foreign Application Priority Data
Sep. 21, 2005 (IT) .............................. PD2005A0271

(51) Int. Cl.
*B60B 21/06* (2006.01)
(52) U.S. Cl. .......................................... 301/58; 301/104
(58) Field of Classification Search .................... 301/58, 301/59, 104
See application file for complete search history.

(56) References Cited

U.S. PATENT DOCUMENTS

| | | | |
|---|---|---|---|
| 308,794 A * | 12/1884 | Pratt ........................ | 301/95.105 |
| 476,433 A * | 6/1892 | Vetterlein .................. | 301/58 |
| 496,844 A * | 5/1893 | Baker ....................... | 301/58 |
| 672,747 A * | 4/1901 | Wheeler ................... | 301/58 |
| 1,043,283 A * | 11/1912 | Zarth ........................ | 301/56 |
| 1,635,849 A * | 7/1927 | Isguerra .................... | 301/58 |
| 5,806,935 A * | 9/1998 | Shermeister .............. | 301/58 |
| 6,666,525 B1 * | 12/2003 | Schroepfer ............... | 301/80 |
| 6,811,228 B2 * | 11/2004 | Tien ......................... | 301/58 |
| 7,178,239 B2 * | 2/2007 | Meggiolan et al. ....... | 29/894.342 |

(Continued)

FOREIGN PATENT DOCUMENTS

EP    0 150 518    5/1988

(Continued)

OTHER PUBLICATIONS

Flowdrill Process from www.flowdrill.com printed on Mar. 12, 2008.

*Primary Examiner* — Russell Stormer
(74) *Attorney, Agent, or Firm* — Stradley Ronon Stevens & Young, LLP

(57) ABSTRACT

A method for the manufacture of a wire wheel of the type comprising a rim and a hub secured to each other by a plurality of spokes. Each spoke includes a stem at the opposed axial ends of which are arranged respective anchorage members capable of being secured respectively to the hub and to the rim. The member for anchorage to the rim is received in a seat fixed on the rim with the capability of limited axial displacement in the seat. The seat is provided integrally on the rim in the form of a substantially tubular appendage thereof and the anchorage member is received in a sealed manner with coupling of the cylinder/piston type in the tubular appendage.

23 Claims, 2 Drawing Sheets

U.S. PATENT DOCUMENTS

| | | |
|---|---|---|
| 7,744,165 B2 * | 6/2010 | Cappellotto ............... 301/58 |
| 2002/0060494 A1 * | 5/2002 | Leo et al. ............... 301/67 |
| 2003/0230928 A1 | 12/2003 | Schroepfer |
| 2004/0155518 A1 | 8/2004 | Schlanger |
| 2007/0057566 A1 * | 3/2007 | Cappellotto ............... 301/58 |
| 2008/0290721 A1 * | 11/2008 | Wang ............... 301/58 |

FOREIGN PATENT DOCUMENTS

| | | |
|---|---|---|
| EP | 1 209 006 | 5/2002 |
| EP | 1 502 768 | 2/2005 |
| JP | 60038201 A * | 2/1985 |
| JP | 63265701 A * | 11/1988 |
| WO | 2005/058613 | 6/2005 |

* cited by examiner

US 8,033,617 B2

WIRE-SPOKED WHEEL HAVING SPOKES COUPLED TO RIM

RELATED APPLICATION

This application is a U.S. national phase application of PCT International Application No. PCT/IT2006/000659 filed on Sep. 14, 2006.

TECHNICAL FIELD OF THE INVENTION

The subject of the present invention is a method for the manufacture of a wire wheel and a wheel obtained by the method.

STATE OF THE ART

The invention refers in particular to the production of wheels of the type comprising a rim and a hub secured to each other by a plurality of spokes. Each spoke includes a stem at the opposed axial ends of which are arranged respective anchorage members capable of being secured respectively to the hub and to the rim. The member for anchorage to the rim is received in a seat fixed on the rim with the capability of limited axial displacement in the seat.

Wheels having such features may be produced with characteristics suitable for the fitting of tubeless tires. Such wheels are taught, for example, in International Patent Publication No. WO 2005/058613 filed on behalf of the same applicants. The teaching is based on the fact that, in order to produce wheels suitable for the fitting of that type of tire, it is necessary on the one hand to produce a gas-tight coupling between the spoke part which hooks onto the rim and the rim itself, and on the other hand it is necessary take into account the fact that the rim, in use, is subject to inevitable elastic deformation which must be transferred to, and/or absorbed by, the rim-and-spoke assembly without prejudicing the gas-tight seal.

SUMMARY OF THE INVENTION

The invention is placed in that context by providing a method for the manufacture of a wire wheel which makes it possible to produce such wheels in a simplified manner compared with the previous teachings of the same applicants and with greater economy. To meet these and other objects, and in view of its purposes, the present invention provides a method for the manufacture of a wire wheel of the type comprising a rim and a hub secured to each other by a plurality of spokes. Each spoke includes a stem at the opposed axial ends of which are arranged respective anchorage members capable of being secured respectively to the hub and to the rim. The member for anchorage to the rim is received in a seat fixed on the rim with the capability of limited axial displacement in the seat. The seat is provided integrally on the rim in the form of a substantially tubular appendage thereof and the anchorage member is received in a sealed manner with coupling of the cylinder/piston type in the tubular appendage.

It is to be understood that both the foregoing general description and the following detailed description are exemplary, but are not restrictive, of the invention.

BRIEF DESCRIPTION OF THE DRAWINGS

The characteristics and advantages of the invention will become clearer from the detailed description of two preferred, but not exclusive, examples of application thereof, illustrated by way of non-limiting example with reference to the appended drawings, in which.

DETAILED DESCRIPTION OF THE INVENTION

Figure 1:
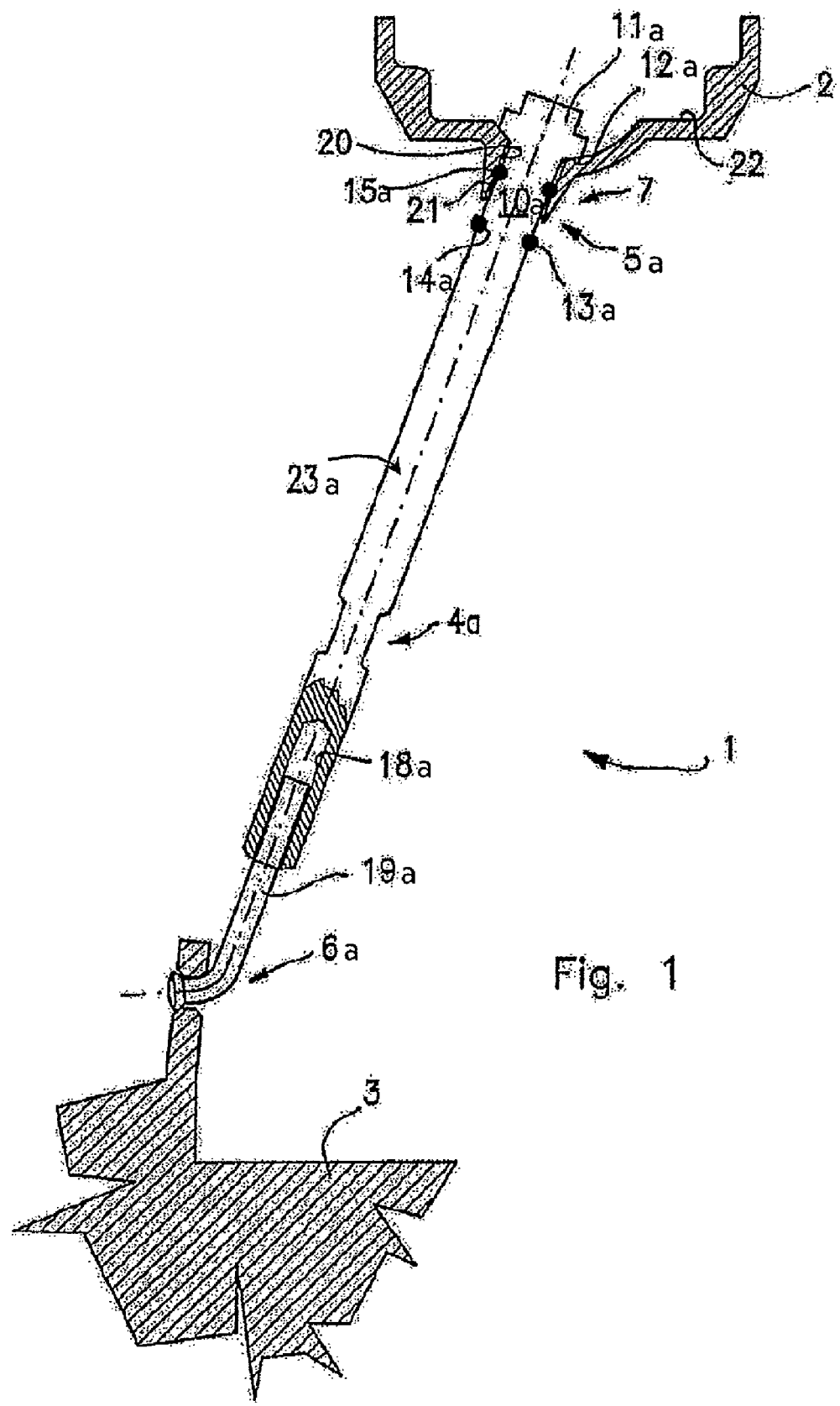
FIG. 1 is a partial diagrammatic view in longitudinal section of a first exemplary embodiment of a wire wheel according to the present invention.
Figure 2:
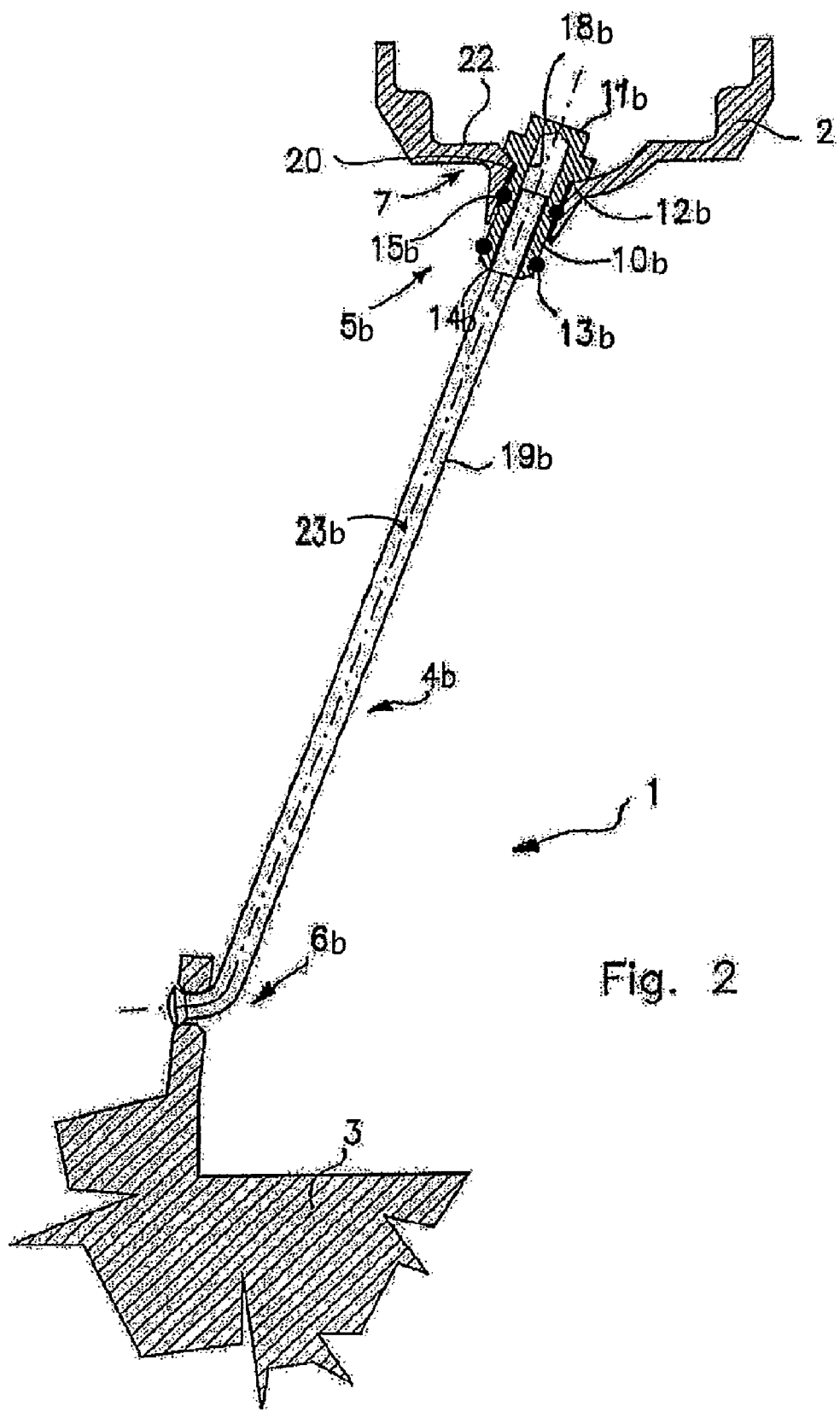
FIG. 2 is a similar partial diagrammatic view in longitudinal section of a second exemplary embodiment of a wire wheel according to the invention.

In the drawings, details that are analogous or technically equivalent are designated by the same reference numbers. The reference 1 indicates as a whole a wire wheel including a rim 2 and a hub 3 interconnected with each other by a plurality of spokes, indicated by 4a in FIG. 1 and by 4b in FIG. 2.

Both the spokes 4a and the spokes 4b comprise a predominantly longitudinal stem 23a and 23b, at the longitudinally opposed ends of which are arranged respective members for anchorage to the rim 2 and to the hub 3, indicated in both cases by reference numbers 5a, 5b and 6a, 6b, respectively.

The two types of spokes 4a, 4b differ from each other. In the first case, the stem 23a is produced integrally with the member 5a for anchorage to the rim 2. In the second case, the stem 23b is produced integrally with the member 6b for anchorage to the hub 3.

In both cases, the member 5a, 5b for anchorage to the rim 2, and the corresponding complementary element 7 for anchorage on the rim 2 itself, have an identical configuration.

The spoke 4a lends itself more to the production of spokes with a stem 23a made of a light alloy, such as aluminium alloy and the like. The spoke 4b lends itself more to the production of spokes with a stem 23b made of steel.

The member 5a, 5b for anchorage to the rim 2 comprises a cylindrical tang 10a, 10b with an operating key 11a, 11b at its free end, followed by an annular shoulder 12a, 12b against which bears a snap ring 13a, 13b lodged in a corresponding seat 14a 14b. In an intermediate position between the shoulder 12a, 12b, and the snap ring 13a 13b a second seat is arranged for a sealing ring 15a, 15b for example of the O-ring type.

In the spoke 4a, the cylindrical tang 10a is extended to form the stem 23a of the spoke 4a itself and has at the opposite end a blind threaded hole 18a into which is screwed a terminal portion 19a having an elbowed head which constitutes the member 6a for anchorage to the hub 3.

In the spoke 4b, the cylindrical tang 10b is terminated without any extension and is axially pierced by the blind hole 18b. In this case also, a portion 19b is provided which has a greater axial length than in the preceding example, being threaded and having the elbowed head. The elbowed head may be substituted by other mechanisms, which are known per se, for anchorage between spoke and hub.

The complementary element 7 for anchorage on the rim 2 comprises a seat 20 provided integrally on the rim 2 in the form of a substantially tubular appendage 21 and in which the cylindrical tang 10a, 10b is received in a sealed manner, guaranteed by the ring 15a 15b, with coupling of the cylinder/piston type, and also with the capability of axial displacement in the seat, limited by the stroke limiting means shoulder 12a, 12b, and snap ring 13a, 13b for said cylinder/piston coupling. Normally, the shoulder 12a, 12b abuts against the root of the appendage 21 at the base of the channel 22 of the rim 2 itself.

The tubular appendage 21 is obtained by localized deformation and drilling of the rim 2 at the channel 22. The deformation and drilling are preferably effected at the same time by drilling the rim 2 with a fusion tip. This drilling method is known from various documents, for example European Patent Publication No. EP0150518, or from the website of Flowdrill Inc. of St. Louis, Mo. (www.flowdrill.com) and involves a drilling tool coming into contact with the material to be drilled with a relatively high axial pressure and rotation speed. The heat generated renders the material soft and malleable so that it can be displaced by the drilling tool and transported in the feed direction so as to form, in the case in question, a cylindrical tubular appendage 21, tapered externally in a direction away from the rim 2.

Provision is made, however, for the tubular appendage 21 to be obtainable by different techniques, essentially of hot or cold deformation of the rim 2 in the region involved, such as deep-drawing or punching techniques, and the like.

By the above-mentioned coupling, of the cylinder/piston type, between the rim 2 and the corresponding anchorage member 5a, 5b of the spoke 4a, 4b, the rim 2 can deform elastically in use without compromising the seal of the rim-to-spoke coupling, thus keeping the inflation chamber of the tire gas-tight, thereby allowing the correct use of tires without an air chamber (so-called "tubeless"). At the same time, the wheel 1 can be produced in a simple manner, with high-speed processing and at low cost.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention.

The invention claimed is:

1. A wire-spoked wheel comprising:
    a rim having an integral seat in the form of a tubular appendage of the rim;
    a hub; and
    a plurality of spokes securing the rim to the hub, each spoke including a stem having a first axial end on which is arranged a first anchorage member capable of being secured to the hub and a second opposed axial end on which is arranged a second anchorage member capable of being secured to the rim, and wherein the second anchorage member is received (a) in the seat of the rim with the capability of limited axial displacement in the seat and (b) in a sealed manner with a cylinder/piston coupling in the tubular appendage, wherein the second anchorage member has an annular shoulder and a snap ring which combine to limit the stroke of the cylinder/piston coupling.

2. The wire-spoked wheel according to claim 1, wherein the rim has a channel and the tubular appendage is obtained by localized deformation and drilling of the rim at the channel.

3. The wire-spoked wheel according to claim 2, wherein the deformation and drilling are effected at the same time by drilling of the rim with a fusion tip.

4. The wire-spoked wheel according to claim 1, wherein the second anchorage member has a cylindrical tang and the wheel further comprises a sealing ring interposed between the tang and the seat of the rim, the sealing ring providing a gas-tight seal enabling the tang to slide axially in a gas-tight manner in the seat of the rim.

5. The wire-spoked wheel according to claim 4, wherein the sealing ring is positioned between the annular shoulder and the snap ring.

6. The wire-spoked wheel according to claim 1, wherein the tubular appendage has an outer surface tapered in a direction away from the rim.

7. The wire-spoked wheel according to claim 1, wherein the second anchorage member is integral with the stem of each spoke.

8. A wire-spoked wheel comprising:
    a rim having an integral seat in the form of a tubular appendage of the rim, the tubular appendage having an outer surface tapered in a direction away from the rim;
    a hub;
    a sealing ring; and
    a plurality of spokes securing the rim to the hub, each spoke including a stem having a first axial end on which is arranged a first anchorage member capable of being secured to the hub and a second opposed axial end on which is arranged a second anchorage member integral with the stem and capable of being secured to the rim, and wherein the second anchorage member:
    (a) is received (i) in the seat of the rim with the capability of limited axial displacement in the seat and (ii) in a sealed manner with a cylinder/piston coupling in the tubular appendage, and
    (b) has an annular shoulder and a snap ring, which combine to limit the stroke of the cylinder/piston coupling, and a cylindrical tang, and wherein the sealing ring is positioned between the annular shoulder and the snap ring, the sealing ring creating a gas-tight seal enabling the tang to slide axially in a gas-tight manner in the seat of the rim.

9. The wire-spoked wheel according to claim 8, wherein the rim has a channel and the tubular appendage is obtained by localized deformation and drilling of the rim at the channel.

10. The wire-spoked wheel according to claim 9, wherein the deformation and drilling are effected at the same time by drilling of the rim with a fusion tip.

11. A wire-spoked wheel comprising:
    a rim having an integral seat in the form of a tubular appendage of the rim;
    a hub;
    a sealing ring; and
    a plurality of spokes securing the rim to the hub, each spoke including a stem having a first axial end on which is arranged a first anchorage member capable of being secured to the hub and a second opposed axial end on which is arranged a second anchorage member capable of being secured to the rim, and wherein the second anchorage member:
    (a) is received (i) in the seat of the rim with the capability of limited axial displacement in the seat and (ii) in a sealed manner with a cylinder/piston coupling in the tubular appendage, and
    (b) has an annular shoulder and a snap ring which limit the stroke of the cylinder/piston coupling, with the sealing ring arranged in an intermediate position between the annular shoulder and the snap ring.

12. The wire-spoked wheel according to claim 11, wherein the rim has a channel and the tubular appendage is obtained by localized deformation and drilling of the rim at the channel.

13. The wire-spoked wheel according to claim 12, wherein the deformation and drilling are effected at the same time by drilling of the rim with a fusion tip.

14. The wire-spoked wheel according to claim 11, wherein the second anchorage member has a cylindrical tang and the sealing ring is interposed between the tang and the seat of the rim, the sealing ring providing a gas-tight seal enabling the tang to slide axially in a gas-tight manner in the seat of the rim.

15. The wire-spoked wheel according to claim 11, wherein the tubular appendage has an outer surface tapered in a direction away from the rim.

16. The wire-spoked wheel according to claim 11, wherein the second anchorage member is integral with the stem of each spoke.

17. A wire-spoked wheel comprising:

a rim having an integral seat in the form of a tubular appendage of the rim;

a hub;

a sealing ring completely contained in the tubular appendage; and a plurality of spokes securing the rim to the hub, each spoke including a stem having a first axial end on which is arranged a first anchorage member capable of being secured to the hub and a second opposed axial end on which is arranged a second anchorage member capable of being secured to the rim, and wherein the second anchorage member is received (a) in the seat of the rim with the capability of limited axial displacement in the seat and (b) in a sealed manner with a cylinder/piston coupling between the second anchorage member and the seat of the rim in the tubular appendage.

18. The wire-spoked wheel according to claim 17, wherein the rim has a channel and the tubular appendage is obtained by localized deformation and drilling of the rim at the channel.

19. The wire-spoked wheel according to claim 18, wherein the deformation and drilling are effected at the same time by drilling of the rim with a fusion tip.

20. The wire-spoked wheel according to claim 17, wherein the second anchorage member has a cylindrical tang and the sealing ring is interposed between the tang and the seat of the rim, the sealing ring providing a gas-tight seal enabling the tang to slide axially in a gas-tight manner in the seat of the rim.

21. The wire-spoked wheel according to claim 20, wherein the second anchorage member has an annular shoulder and a snap ring which combine to limit the stroke of the cylinder/piston coupling, and the sealing ring is positioned between the annular shoulder and the snap ring.

22. The wire-spoked wheel according to claim 17, wherein the tubular appendage has an outer surface tapered in a direction away from the rim.

23. The wire-spoked wheel according to claim 17, wherein the second anchorage member is integral with the stem of each spoke.

* * * * *